United States Patent [19]

Danico

[11] Patent Number: 4,588,104

[45] Date of Patent: May 13, 1986

[54] FLOOR PAN PLUG

[75] Inventor: Henry F. Danico, Stoneham, Mass.

[73] Assignee: TRW, Inc., Cleveland, Ohio

[21] Appl. No.: 754,484

[22] Filed: Jul. 12, 1985

[51] Int. Cl.$^4$ .............................................. B65D 45/16
[52] U.S. Cl. ..................................... 220/326; 220/307
[58] Field of Search ....................... 220/307, 326, 309; 52/302

[56] References Cited

U.S. PATENT DOCUMENTS

| Re. 28,797 | 5/1976 | Brewer . | |
|---|---|---|---|
| Re. 30,326 | 7/1980 | Van Buren, Jr. . | |
| 2,130,637 | 9/1938 | Darling . | |
| 3,018,535 | 1/1962 | Griffin | 220/326 |
| 3,072,287 | 1/1963 | Sampson . | |
| 3,278,066 | 10/1966 | George et al. . | |
| 3,935,686 | 2/1976 | Dozois . | |
| 3,944,107 | 3/1976 | Wallace et al. | 220/326 |
| 4,363,420 | 12/1982 | Andrews . | |

FOREIGN PATENT DOCUMENTS

| 1350558 | 4/1974 | United Kingdom . |
|---|---|---|
| 1390125 | 4/1975 | United Kingdom . |
| 1466563 | 3/1977 | United Kingdom . |

*Primary Examiner*—George T. Hall
*Attorney, Agent, or Firm*—Fay, Sharpe, Fagan, Minnich & McKee

[57] ABSTRACT

A closure device for closing an aperture in a panel includes a plate and plural retaining tabs extending from one face of the plate. The tabs have first and second lips which cooperate with the panel adjacent the aperture for centrally locating and locking the closure device in position. The plate also includes a cup-shaped central region which extends outwardly from the plate at least as far as the plural tabs to reduce the potential for any injury or damage from the tabs. A seal member is interposed between the closure device and panel for effectively sealing therebetween.

15 Claims, 4 Drawing Figures

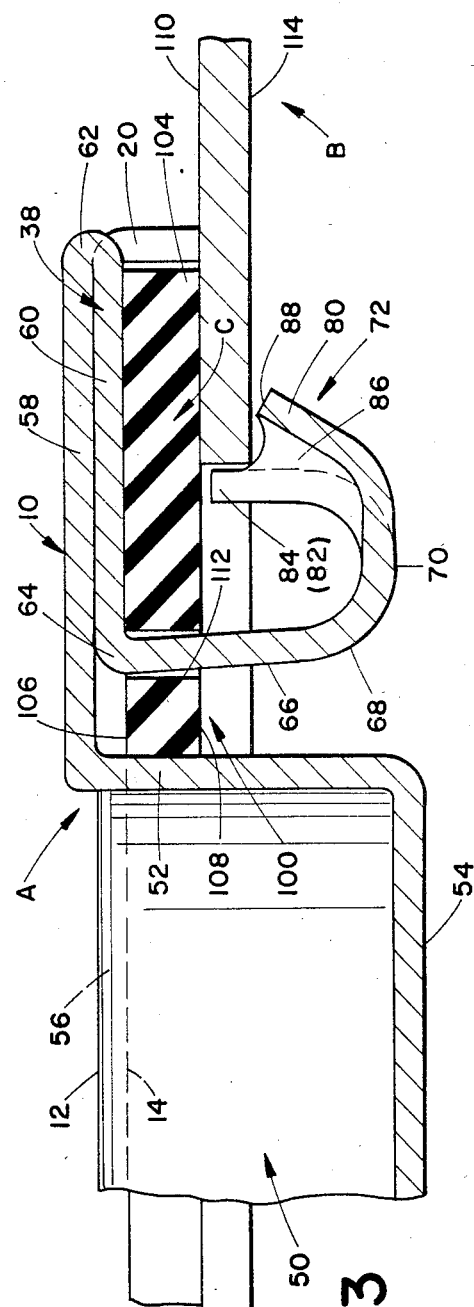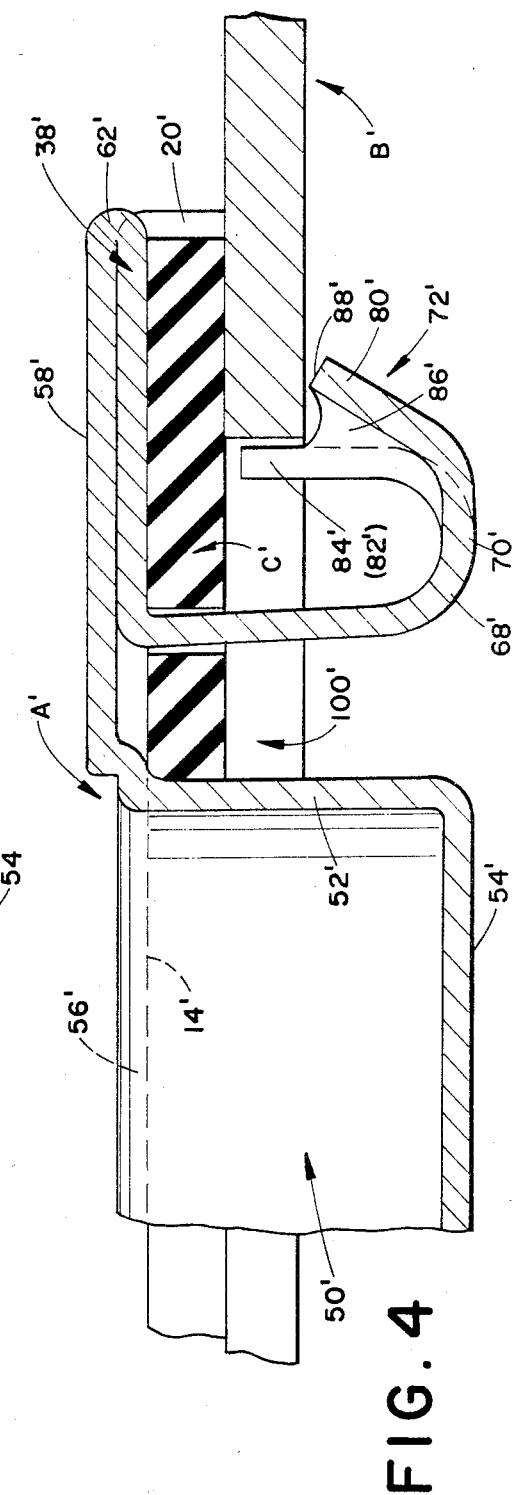

FLOOR PAN PLUG

BACKGROUND OF THE INVENTION

This invention pertains to the art of closure devices, and, more particularly, to such devices for use with openings or apertures formed in thin plates, rigid sheets of metal, or other materials.

The invention is particularly applicable to such a closure used for covering an opening in a vehicle body panel and will be described with particular reference thereto. It will be appreciated, however, that the invention has broader applications and may advantageously be employed for other uses in a variety of different environments.

In the manufacture of vehicles, closure devices are used to permanently close various body panel apertures or openings which have served their intended purpose and are no longer required, or to perform some other useful function such as to reduce the effective diameter of an opening to a desired new size or to provide a suitable mounting surface for another component. Such openings may be requied initially for many reasons, eg., as paint discharge openings or access openings to accommodate mounting of vehicle components. These apertures should be tightly covered or filled after they have served their useful function for excluding moisture, road dirt, noise, exhaust fumes, and the like.

Conventional closure devices include a generally thin plate provided with a plurality of retaining legs or tabs. The plate is located in a manner to close or reduce the size of an aperture in a body panel from one side thereof. The legs or tabs, in turn, project through the aperture in retaining relationship with the other side of the body panel. Such arrangement is disadvantageous due to the fact that workers can scrape their hands or other areas on these projecting tabs while performing further assembly steps on the vehicle. Additionally, because of the necessary placement of the apertures in a vehicle body, prior closure devices have caused undesired piercing of adjacent components or structures upon imposition of forces such as those encountered in a collision.

It has, therefore, been considered desirable to develop a new and improved closure device and assembly which overcome the foregoing deficiencies and others while providing better and more effective operational results.

BRIEF SUMMARY OF THE INVENTION

According to the subject invention, a closure assembly is provided for an aperture in a panel. The assembly utilizes a thin plate having a plurality of retaining legs or tabs depending from adjacent the plate outer periphery at spaced locations therearound. Each leg has one portion thereof extending outwardly from the plate inner surface at a location spaced inwardly from the plate outer periphery. Locking means associated with each leg are adapted to retain the plate in covering relation at a first surface of the panel with a predetermined aperture having an area which is smaller than the area of the plate. A central region extends outwardly from the plate in the same direction and at least the same distance as the plurality of legs.

According to another aspect of the invention, the locking means of each leg includes another portion extending outwardly from the one portion toward the plate outer periphery and terminates in a retaining end.

According to a further aspect of the invention, each retaining end is comprised of at least one first lip. The first lips are flexed radially inward from a normal position as the legs are passed through an associated panel aperture. When the closure assembly is properly positioned in covering relation with an aperture, the first lips flex radially outward back to their normal position in cooperative retaining relation with a second surface of the panel opposed to the first surface.

In accordance with still another aspect of the invention, each retaining end includes at least one second lip adapted for receipt in the panel aperture to maintain the closure assembly in a centrally located position relative thereto.

In accordance with yet another aspect of the invention, a containing wall or flange extends outwardly from the plate at the plate outer periphery in the same direction as the legs and central region. The containing wall is adapted to closely confine an expansible seal member interposed between the plate and the panel first surface.

The principal advantage of the present invention is the provision of an improved closure assembly for closing an aperture in a panel.

Another advantage of the invention resides in the provision of such an assembly which can serve as a protective guard and securely close a panel aperture.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in the specification and illustrated in the accompanying drawings which form a part hereof and wherein:

FIG. 3 is an enlarged cross-sectional view taken along lines 3—3 of FIG. 1 and including an associated seal member; and, FIG. 4 is an enlarged cross-sectional view similar to FIG. 3 showing a slightly modified form of the invention.

DETAILED DESCRIPTION OF THE PREFERRED EMBODIMENTS

Figure 1:
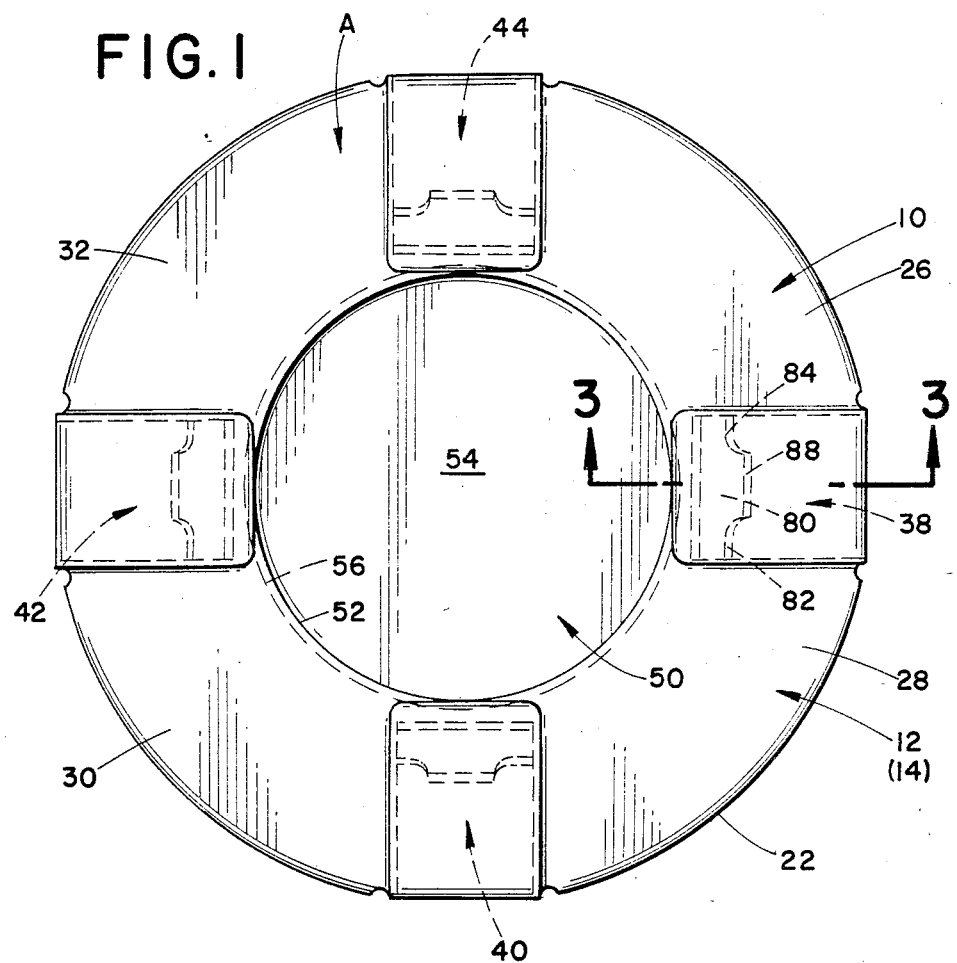
FIG. 1 is a plan view of a closure device formed in accordance with the subject invention.
Figure 2:
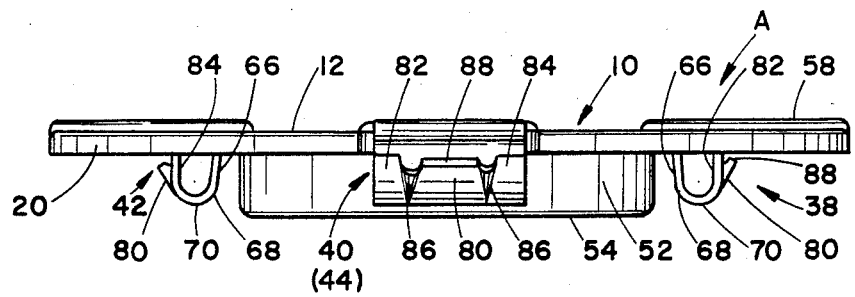
FIG. 2 is a side elevational view of the closure device shown in FIG. 1.

Referring now to the drawings wherein the showings are for purposes of illustrating preferred embodiments of the invention only and not for purposes of limiting same, FIGS. 1-3 show the subject new closure device A which is to be securely affixed to a paanel B in covering relation to a panel aperture.

The closure device is comprised of a thin plate 10 formed of sheet metal or other rigid material to have a first or outer surface 12 and a second or inner surface 14 in opposed relation to each other. As best shown in FIG. 1, plate 10 has a generally circular peripheral conformation, although it will be understood that other conformations may also be used satisfactorily to accommodate a particular application or need. A containing wall 20 is integrally formed along the outer periphery 22 of the plate to depend from second surface 14 along discontinuous arcuate portions 26, 28, 30, 32. These arcuate portions are separated from one another by retaining tabs or legs. In the preferred embodiment shown, four retaining tabs 38, 40, 42, and 44 are illustrated, although a greater or lesser number of such tabs may be employed with equal success.

A central, cup-shaped region 50 is formed in plate 10 so as to extend outwardly from surface 14 some predetermined distance. The function and purpose of the central region will become apparent hereinafter. Region 50 is defined by a side wall 52 having a generally cylindrical conformation and a generally circular bottom wall 54. Here, too, the central region may take a variety of conformations without departing from the intent or scope of the invention. Cup-shaped central region 50 may be formed integrally with plate 10 as by conventional forming or stamping techniques so that side wall 52 merges into plate 10 at a connecting zone 56.

Continuing with reference to FIGS. 1—3, tabs or legs 38, 40, 42, 44 are constructed in an identical manner, so that the following description of leg 38 is equally applicable to the remaining legs unless otherwise specifically noted. Leg 38 forms a recessed area 58 with respect to plate 10. This relationship is particularly evident in FIG. 3 where recess 58 is shown extending outwardly from the plate surface 12 in a direction opposed to the outward extension of the central region 50. The legs also are formed integrally with plate 10 as by conventional forming or stamping techniques. More specifically, leg 38 includes a first portion 60 which is folded back from area 62 at outer periphery 20 against recess 58. Area 62 is crushed or peened so as to minimize any open area between the recess and leg first portion, particularly at the fold area (FIG. 3). The leg first portion extends in substantially coplanar relation with the plate 10 from the plate outer periphery to a radially inner end 64 spaced toward central region 50.

A leg second portion 66 extends outwardly from the plate generally perpendicular to the leg first portion at inner end 64 thereof, and is generally parallel with central region side wall 52. The leg second portion is integral with the leg first portion and teminates at an outermost curvilinear connecting area 68. This connecting area connects the outermost end of the leg second portion with the inner end of a leg third portion 70. The leg third portion extends generally normally outward from second portion 66 in generally transverse spaced relation to leg first portion 60. A retaining means generally designated 72 is disposed at the outer free end of the leg third portion.

More particularly, retaining means 72 comprises an integral structure having a first or locking lip 80 disposed intermediate a pair of second or positioning lips 82, 84. The second lips have a length greater than the length of the first lip and are substantially parallel to leg second portion 66. First lip 80 is angularly disposed with respect to the second lips, and connecting regions 86 integrally join each second lip with the first lip. The outermost terminal end 88 of the first lip is adapted to retainingly cooperate with a surface of an associated panel member as will be described hereinafter.

As is particularly shown in FIGS. 2 and 3, bottom wall 54 of central region 50 is disposed outwardly from second or inner surface 14 of plate 10 a distance which is slightly greater than the outermost extensions of the legs 38, 40, 42, 44 at connecting areas 68 and third portions 70 thereof. For reasons which will become apparent hereinafter, central region 50 must extend at least as far from second or inner surface 14 as do the outermost extensions of the legs.

Referring now to FIG. 3, the interrelation of the closure device A with a vehicle body panel B and a seal member C is shown. The panel includes an aperture 100 which has some predetermined conformation and dimensional characteristics. In the case of the preferred embodiment shown, aperture 100 is generally circular. Plate 10 of the closure device has a peripheral conformation generally the same as, although larger than aperture 100.

Seal member C has a generally annular conformation with an inner peripheral edge 102 which generally corresponds to the outer periphery of central region 50 side wall 52. The outer peripheral edge 104 of the seal member generally corresponds to the outer periphery of plate 10 as defined by containing wall 20. Opposed planar surfaces 106, 108 of the seal member are adapted for abutting engagement with plate inner surface 14 and leg first portions 60, and the facing surface 110 of panel B, respectively. The seal member includes slots 112 at spaced intervals therearound to accommodate receipt of legs 38, 40, 42, 44 therethrough.

As noted, closure device A is somewhat larger than the associated aperture which it covers. Legs 38, 40, 42, 44 include retaining means 72 which are designed and positioned for accommodating a close-fitting, retained relationship of the closure assembly relative to aperture 100. In particular, diametrically opposed second lips 82, 84 on legs 38, 42 and legs 40, 44 generally correspond to the length, width, diameter, and like dimensions of the aperture. First lips 80 on opposed ones of the legs are spaced apart from each other by distances which are greater than the length, width, diameter, and like aperture dimensions.

Panel B includes opposed planar surfaces 110, 114 which are transversely spaced apart from each other by some predetermined distance for defining a panel thickness. The distance between first portion 60 of each leg and the outermost terminal end 88 of the associated first lip 80 is slightly greater than the transverse distance between the leg first portion and the outer free edge of containing wall 20 plus the thickness of panel B. Also, the distance between first portion 60 of each leg and the outermost ends of the associated second lips 82, 84 is less than the transverse distance between the leg first portion and the outer free edge of containing wall 20 plus the thickness of panel B.

Actual installation of closure device A and seal member C into a mounted cooperative relationship with panel B and associated aperture 100 involves an initial mating of the seal member with the closure device. Appropriately positioned passages 112 in the seal member accommodate passage of legs 38, 40, 42, 44 therethrough whereby the seal member is restrained from axial and radial movement relative to body 10. The closure device is then aligned with aperture 100 such that central region 50 extends therethrough. Legs 38, 40, 42, 44 are thus closely spaced to the peripheral edge of the aperture with the areas thereof located generally between the leg third portions and first lips 80 engaging panel surface 110.

Pressure is then exerted on outer surface 12 of the plate in the direction of panel B so that the first lips 80 flex radially inward from their first or normal position generally about inner ends 64 of leg first portions 60 in order to pass through panel aperture 100. Upon sufficient axial movement of the closure device with respect to the panel, the first lip portions 80 of legs 38, 40, 42, 44 flex radially outward back to their normal positions such that outer terminal ends 88 thereof are in close-spaced retaining relation with panel surface 114. The above-described relative dimensioning of the components facilitates such results. Second lips 82, 84 on each leg, in turn, shift into generally abutting relation with the side wall of the panel aperture. In this manner, the first lips lock the closure device in covering relation to the panel and resist any push-out forces which may be exerted thereagainst. The second lips act to positively maintain the closure device in a centralized position relative to the aperture.

When closure assembly A is installed on panel B, seal member C is generally confined axially between plate surface 14 and panel surface 110. In the radial directions, the seal member is substantially confined between side wall 52 of central region 50 and containing wall 20 of the plate. Preferably, seal member C is constructed from an elastomeric material which foams or expands when heated. The seal member is filled with a conventional chemical blowing agent or physical foaming agent which foams and undergoes considerable permanent volumetric expansion, ie., between 75% and 150%, when exposed to elevated temperatures. In the uncured state, the seal material should also have a durometer hardness reading of between 75 and 90, and a density of approximately one gram per cubic centimeter. The seal material should also be water and solvent resistant. Alternatively, a non-expandable blanket-type sealer may be used. Moreover, either one or both sides of the seal member may advantageously be coated with a flowable hot melt adhesive to facilitate adhesion to the closure device A and/or panel B. A variety of known, thermoplastic elastomers are suitable for use in constructing seal member C.

The preferred expansible material of seal member C undergoes gradual cross-linking during exposure to elevated temperatures. Because this cross-linking provides a slowly increasing melting point and an increasing resistance to flow, there is a reduced chance that the seal material will melt or flow out from any interstices between closure device A and panel B. In addition, the containing wall 20 directs the flow of the seal material back into aperture 100 for sealing same. The cross-linking also increases the resistance of the seal material to solvent such as gasoline or oil.

The outward extension of the central region 50 from surface 14 of body 10 to bottom wall 54 is at least as great as the outermost extension of legs 38, 40, 42, 44 from plate inner surface 14. Because of this relationship, any movement toward inner surface 14 will initially engage the bottom wall 54 of central region 50. The bottom wall thus serves as a protective guard from contact with the closure device legs. Such a guard is particularly advantageous for protecting a worker's hands when the worker is performing some task on the vehicle body at or near the closure assembly. In some cases, the tasks are required to be done blindly, so the risk of bodily injury is increased. Still further, the protection provided by central region 50 aids in reducing the potential of having closure device legs 38, 40, 42, 44 pierce other vehicle components in the event the vehicle experiences some impact forces. One example of such benefits would be in conjunction with reducing the potential for rupturing the fuel tank.

A slightly modified embodiment of the subject new closure assembly is illustrated in FIG. 4 wherein like elements are identified by like numerals with a primed (') suffix and new components are identified by new numerals. Closure device A' includes a thin plate 10' and a plurality of identical tabs or legs 38', 40', 42', 44'. In this embodiment, plate 10' merges with central region side wall 52' at an area generally designated 56'. The recess 58' merges with the central region side wall 52' along a radially outer area 122. Also, the second lips, as exemplified by lip 84', extend outwardly from connecting zones 86' a greater distance than in the FIG. 3 embodiment. This allows greater centering engagement between the second legs and an aperture 100' in a panel B' which has a greater thickness than panel B. Finally, FIG. 4 shows bottom wall 54' as extending outwardly from plate 10' generally flush with the outward extension of the closure device legs as exemplified by leg 38'. Such relationships allow the same protective advantages to be realized from central region 50' as were noted above with regard to region 50.

The invention has been described with reference to preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A closure assembly for closing an aperture in a panel comprising:
a thin plate having opposed first and second surfaces and an outer periphery; a plurality of legs depending from said second surface, each leg having one portion extending generally normally outward from said plate second surface at a location spaced inwardly from said plate outer periphery, and locking means associated with each leg adapted to retain said plate positioned on one side of a panel in covering relation with a predetermined aperture having an area which is smaller than the area of said plate; and, a central region depending outwardly from said plate second surface a distance which is at least as great as a furthest extension of said plurality of legs from said second surface, whereby said central region defines a protective guard for said plate.

2. The closure assembly as defined in claim 1 further including a containing wall extending outwardly from said plate second surface along said outer periphery, said closure assembly adapted to receive a seal member intermediate said plate second surface and one surface of an associated panel, whereby movement of the seal member is constrained by said plate second surface, said central region, said containing wall, and by the one surface of the associated panel.

3. The closure assembly as defined in claim 1 wherein the locking means of each leg includes another portion extending outwardly from said one portion toward said plate outer periphery and terminating in a retaining end.

4. The closure assembly as defined in claim 3 wherein said retaining end comprises at least one first lip cooperable with the other surface of an associated panel opposed to the one surface, said first lips being flexed inwardly from a normal position as said legs are passed through an aperture in the associated panel and flexed outwardly back to said normal position in retaining engagement with the panel other surface when said plate is properly positioned on the panel one surface in covering relation with the aperture.

5. The closure assembly as defined in claim 4 wherein said retaining end further comprises at least one second lip closely adjacent said first lip, said second lip adapted for receipt in an aperture of an associated panel for maintaining a generally centered relationship between said plate and aperture.

6. The closure assembly as defined in claim 5 wherein said second lip is adapted for close-spaced association with the side wall of an aperture in an associated panel when said plate is disposed in covering relation to the aperture.

7. The closure assembly as defined in claim 5 wherein the first and second lips on each retaining end are interconnected by connecting zones extending therebetween.

8. The closure assembly as defined in claim 5 wherein said retaining ends include a pair of second lips having a first lip interposed therebetween.

9. A closure assembly for closing an aperture in a panel comprising:
a thin plate having opposed first and second surfaces and an outer periphery; a plurality of integral legs depending from said second surface, each leg having a first portion extending radially inward from said outer periphery in close spaced overlaying relation to said second surface, a second portion extending outwardly from said plate second surface generally normal to said first portion at an innermost end area thereof, a third portion extending from an outermost end area of said second portion radially toward said plate outer periphery, and plate retaining means at the outer terminal end of said third portion adapted to fixedly secure said plate in covering relation with a predetermined aperture in an associated panel; and, a central cup-like portion in said plate extending outwardly from said second surface at least as far as the furthest extension of said plurality of legs from said second surface, said cup-like portion being defined by a side wall and a bottom wall with said side wall being spaced radially inward in said plate from said innermost ends of said leg first portions.

10. The closure assembly as defined in claim 9 wherein said plate retaining means includes a first lip having a first normal position, said first lip adapted to be flexed radially inward from said normal position in response to contact with the side wall of an aperture in an associated panel as said plate is moved into a proper covering relationship therewith at one side of the panel, said first lip flexing back to said normal position in retaining relation to the side of the panel opposite the one side when said plate is positioned in proper covering relation to the panel.

11. The closure assembly as defined in claim 10 wherein said plate retaining means includes a second lip adapted to be received in an aperture in an associated panel when said plate is placed in a proper covering relationship therewith, said second lip adapted to be closely spaced to the side wall of the aperture for retaining said plate in a generally centered relationship thereto.

12. The closure assembly as defined in claim 11 wherein said first and second lips are angularly disposed with respect to each other, said second lip extending in a direction generally normal to said plate second surface.

13. The closure assembly as defined in claim 9 further including a containing wall depending from said plate second surface at said outer periphery.

14. The closure assembly as defined in claim 13 wherein said containing wall is discontinuous about said outer periphery.

15. The closure assembly as defined in claim 9 further including seal means associated with said plate second surface adapted to be sealingly interposed between said second surface and an associated panel having an aperture to be closed by said plate.

* * * * *